US008924972B2

(12) United States Patent
Levon

(10) Patent No.: US 8,924,972 B2
(45) Date of Patent: Dec. 30, 2014

(54) METHOD AND SYSTEM FOR LOGGING INTO A VIRTUAL ENVIRONMENT EXECUTING ON A HOST

(71) Applicant: Oracle International Corporation, Redwood City, CA (US)

(72) Inventor: John B. Levon, Sale (GB)

(73) Assignee: Oracle International Corporation, Redwood Shores, CA (US)

( * ) Notice: Subject to any disclaimer, the term of this patent is extended or adjusted under 35 U.S.C. 154(b) by 273 days.

(21) Appl. No.: 13/628,112

(22) Filed: Sep. 27, 2012

(65) Prior Publication Data

US 2014/0089918 A1  Mar. 27, 2014

(51) Int. Cl.
*G06F 9/455* (2006.01)

(52) U.S. Cl.
USPC ............................................................. 718/1

(58) Field of Classification Search
None
See application file for complete search history.

(56) References Cited

U.S. PATENT DOCUMENTS

| | | | |
|---|---|---|---|
| 2005/0080915 A1* | 4/2005 | Shoemaker et al. | 709/231 |
| 2007/0174410 A1* | 7/2007 | Croft et al. | 709/208 |
| 2010/0070870 A1* | 3/2010 | Halperin et al. | 715/742 |
| 2013/0042312 A1* | 2/2013 | Wickman | 726/7 |
| 2013/0055102 A1* | 2/2013 | Matthews et al. | 715/740 |

* cited by examiner

*Primary Examiner* — Emerson Puente
*Assistant Examiner* — Dong Kim
(74) *Attorney, Agent, or Firm* — Osha Liang LLP

(57) ABSTRACT

A method for logging into a guest virtual environment (VE) from a host VE. The method includes receiving a request to login into the guest VE from the host VE. In response to the request, creating a virtual terminal driver (VTD). The VTD comprises a host extender located in the host VE and a guest extender located in a sub-host VE. The host VE and sub-host VE are configured to communicate using a master terminal and a slave terminal. Providing the guest extender to the third VE as a virtual serial terminal (VST). Logging into the guest VE using the master terminal, the slave terminal, a virtual environment manager (VEM), and the VTD, where the VEM is managing the guest VE.

15 Claims, 6 Drawing Sheets

METHOD AND SYSTEM FOR LOGGING INTO A VIRTUAL ENVIRONMENT EXECUTING ON A HOST

BACKGROUND

Computer systems may include a virtualization mechanism. One type of virtualization mechanism is zones. Zones allow one operating system image to be shared amongst multiple virtual environments. In other words, zones create individual compartments which share an operating system. Zone-based virtualization offers a number of benefits, such as minimizing redundant processes and maximizing utilization of available resources. Another virtualization mechanism is through the use of virtual machines that execute on the same computer system. Each virtual machine executes a separate operating system image. Completely isolated virtual environments, such as virtual machines, provide additional security and protection and give users full control of virtual resources.

SUMMARY

In general, in one aspect the invention relates to a method for logging into a guest virtual environment (VE) from a host VE, the method including, receiving a request to login into the guest VE from the host VE, in response to the request, creating a virtual terminal driver (VTD), where the VTD includes a host extender located in the host VE and a guest extender located in a sub-host VE, where the host VE and sub-host VE are configured to communicate using a master terminal and a slave terminal, providing the guest extender to the third VE as a virtual serial terminal (VST), and logging into the guest VE using the master terminal, the slave terminal, a virtual environment manager (VEM), and the VTD, where the VEM is managing the guest VE.

In general, in one aspect the invention relates to a system including a processor, a host virtual environment (VE), executing on the processor, including a master terminal, a sub-host VE, configured to communicate with the host VE via a slave terminal connected to the master terminal, a guest VE, a virtual terminal driver (VTD), including, a userspace buffer and a host buffer, located in the host VE, a host extender, located in the host VE configured to read and write the userspace buffer and the host buffer, a guest extender, located in the sub-host VE, configured to pass data between the host buffer and the virtual machine as a virtual serial terminal (VST), and a virtual environment manager (VEM), configured to manage the guest VE, and communicate with the VTD.

In general, in one aspect, the invention relates to a non-transitory computer readable medium, including instructions, which when executed on a processor, perform a method, the method including, receiving a request to login into a guest virtual environment (VE) from a host VE, where the guest VE is managed by a VEM, in response to the request, creating a virtual terminal driver (VTD), where the VTD comprises a host extender located in the host VE and a guest extender located in a sub-host VE, where the host VE and sub-host VE are configured to communicate using a master terminal and a slave terminal, providing the guest extender to the guest VE as a virtual serial terminal (VST), and logging into the guest VE using the master terminal, the slave terminal, the VEM, and the VTD.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In general, embodiments of the invention relate to a method and system for logging into one virtual environment (VE) from another virtual environment. More specifically, embodiments of the invention allow an entity in a host VE to log in to a guest VE managed by a virtual environment manager (VEM) located in a sub-host VE. The logging in is performed using a virtual terminal driver (VTD) located in both the host VE and the sub-host VE. The VTD uses a virtual serial terminal (VST) located in the guest VE to pass data into the guest VE. Through the VST, the VTD facilitates the exchange of data between isolated VEs without requiring network connections.

Figure 1:
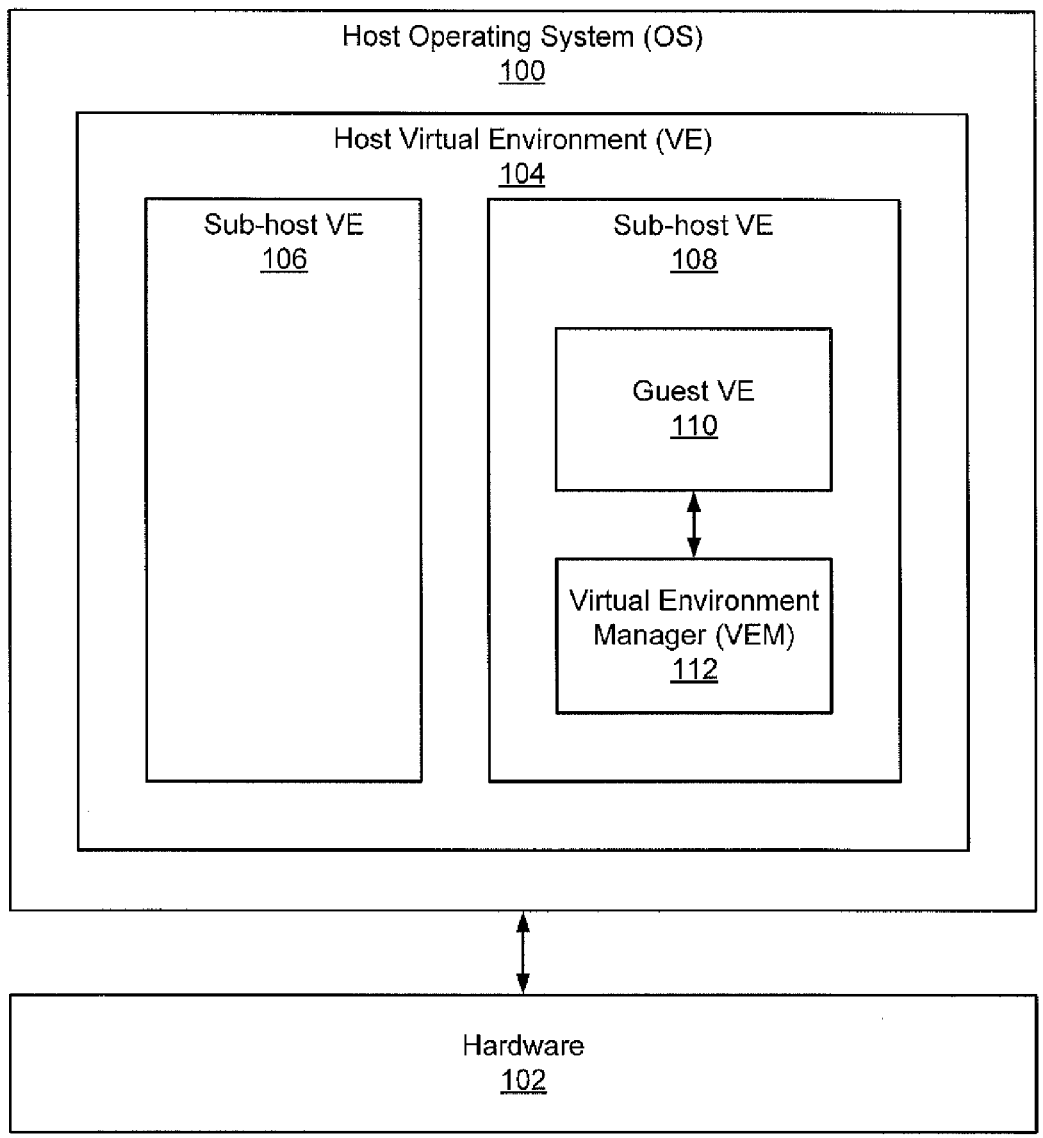
FIGS. 1 and 2 show a schematic diagram of a system in accordance with one embodiment of the invention.

FIG. 1 shows a system in accordance with one embodiment of the invention. The system includes a host operating system (OS) (100) executing on hardware (102). The host OS (100) may be any OS that includes functionality to support the virtualization as described below and to implement one embodiment of the invention. The hardware (102) corresponds to a processor(s), memory, persistent storage, input/output interfaces, and/or any other hardware components necessary to implement one embodiment of the invention.

In one embodiment of the invention, the host OS (100) includes functionality to support virtualization of the resources of the host OS as well as virtualization of the hardware (102). In one embodiment of the invention, the aforementioned virtualization is implemented using a host VE (104) and one or more sub-host VEs (106, 108).

In one embodiment of the invention, a VE (e.g. host VE (104), sub-host VE (106, 108), guest VE (110)) is a software environment that is allocated virtualized hardware resources. In other words, processes in a VE do not have access to physical hardware, but rather are presented with an abstracted version of the hardware. Moreover, multiple distinct VEs may execute on the same physical machine. In such a scenario, processes executing in one VE may not be aware or have access to processes executing in another VE. For example, a VE may be a zone or a virtual machine.

In one embodiment of the invention, the host VE (104) is a global zone and one or more of the sub-host VEs (106, 108) are non-global zones of the global zone. The global zone and the non-global zones all execute the same OS image. In other words, the global zone and the non-global zones share the same operating system instance. However, each of the zones (global and non-global) is an isolated execution environment. More specifically, processes executing in a non-global zone only have access to resources that are exposed to the particular non-global zone. As such, processes executing in one non-global zone are unable to access or interact with resources or processes in the global zone or in other non-global zones. In one embodiment of the invention, processes in the one non-global zone cannot even identify processes in the global zone or in other non-global zones. Unlike the non-global zones, the global zone is able to access and interact with processes and resources within all non-global zones.

In one embodiment of the invention, in at least one of the sub-host VEs (e.g. 108), a guest VE (110) and a VEM (112) exist. The guest VE (110) is a separate virtual environment from the host (104) and sub-host (108) VEs. In one embodiment of the invention, the guest VE (110) is a virtual machine (VM) and the VEM (112) is a virtual machine manager. In this case, the guest VE (110) executes a different OS image than the host VE (104) and the sub-host VE (108). The extra layer of virtualization provided by the guest VE (110) allows an added layer of security or protection. In one embodiment, processes may perform the same steps to access the guest VE (110) as to access a sub-host VE (108). Specifically, management processes facilitate such access so as to appear indistinguishable from accessing a sub-host VE (108).

In one embodiment of the invention, the guest VE (110) is managed by the VEM (112). The VEM (112) executes as a single process within in the sub-host VE (108). The VEM (112) provides and manages virtual hardware and resources for the guest VE (110). The virtual hardware and resources that the VEM (112) provides are allocated to the VEM (112) by the sub-host VE (108), which, in turn, are allocated to the sub-host VE (108) by the host VE (104). In one embodiment of the invention another method of virtualization may be used to execute and manage the guest VE (110).

In one embodiment, other implementations may be used without departing from the scope of the invention. For example, the sub-host VE (108) may be omitted, or a different virtualization scheme may be used for either the host VE (104), the sub-host VE (108), or the guest VE (110). For example, the host VE and sub-host VE may be virtual machines.

Figure 2:
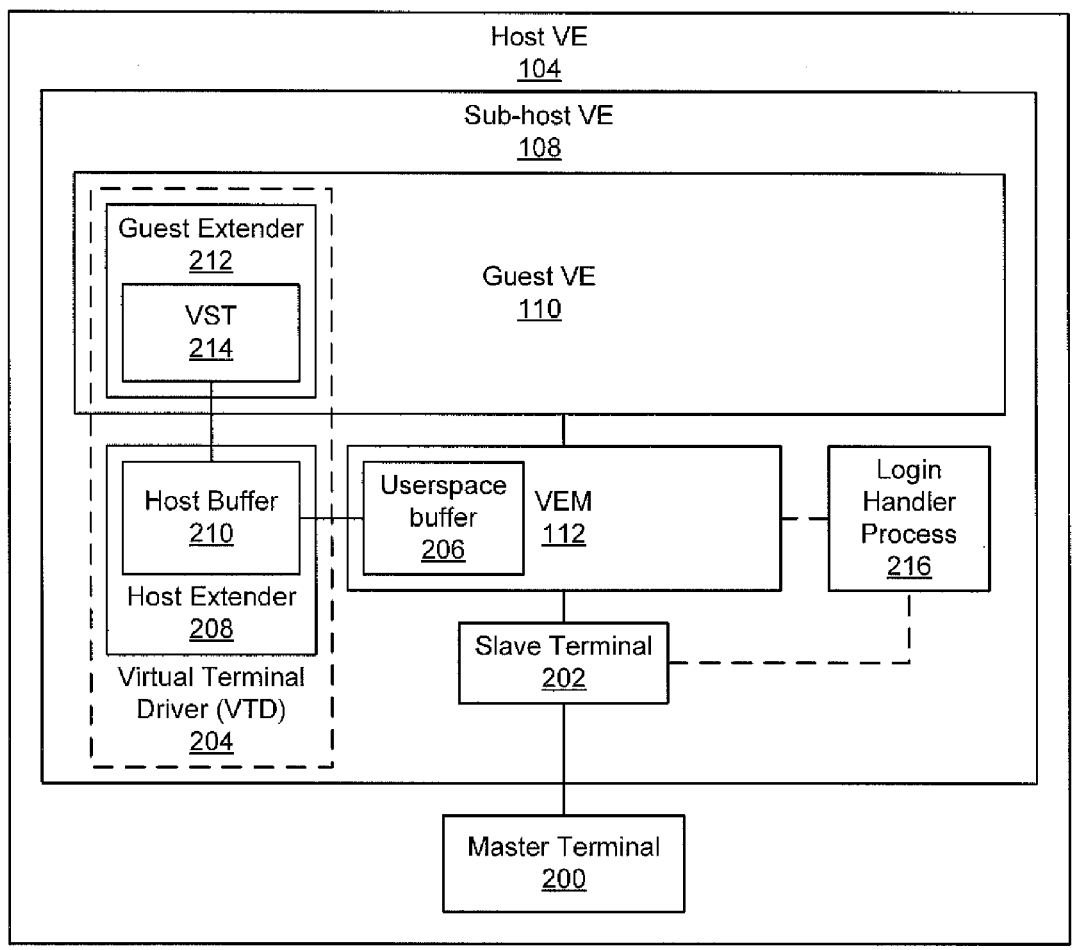

FIG. 2 shows a more detailed schematic diagram in accordance with one embodiment of the invention. The host-VE (104), sub-host VE (108), guest VE (110) and VEM (112) shown in FIG. 2 may be the same or substantially the same as the corresponding components shown in FIG. 1. As shown in FIG. 2, the system may also include a master terminal (200), a slave terminal (202), a login handler process (216), and a VTD (204). Each of these components is discussed below.

The master terminal (200) is located in the host VE (104) in one embodiment of the invention. The master terminal (200) is accessible to a user or other processes located in the host VE (104). In one embodiment of the invention, the master terminal (200) is an interface through which a user or a process may input instructions or data. The master terminal (200) then passes that data to an underlying entity. In one embodiment, the underlying entity is the slave terminal (202) (discussed below). Together with the slave terminal (202), the master terminal (200) forms a master-slave terminal pair. The master terminal (200) passes data to the slave terminal (202) through the connection between the master terminal (200) and the slave terminal (202). In one embodiment of the invention, the master terminal (200) may include an command line interface (CLI), as a method of receiving input.

The slave terminal (202) is located in the sub-host VE (108). As discussed above, the slave terminal (202) is connected to the master terminal (200). In one embodiment of the invention, the slave terminal (202) provides the master terminal (200) with a pseudo system, with which the master terminal may interact. Alternatively, the slave terminal (202) may be configured to copy the input and behavior of the master terminal (200) verbatim. In one embodiment of the invention, the master-slave terminal pair includes functionality to create a login session to the sub-host VE (108) from the host VE (104). Both the master terminal (200) and the slave terminal (202) include functionality to communicate with each other and external processes using standard streams. Standard streams are input and output channel buffers configured to be accessed via file descriptor in one embodiment of the invention.

Continuing with FIG. 2, in one embodiment of the invention, the VTD (204) is a software mechanism by which the guest VE (110) is accessed from the sub-host VE (108). The VTD (204) is composed of parts that span both the sub-host VE (108) and the guest VE (110). In one embodiment of the invention, the portion of the VTD (204) located in the sub-host VE (108) is a host extender (208), in which is located a host buffer. The portion of the VTD (204) located in the guest VE (110) is the guest extender (212), which includes a VST (214). The VST (214) is the mechanism by which the VTD (214) interfaces with the environment of the Guest VE (110). In one embodiment of the invention, the VTD (204) is accessible to the VEM (112) using hostcalls. In one embodiment of the invention, multiple VTDs (204) may exist within the sub-host VE (108). For example, a new VTD (204) may be required for every additional login session to the guest VE (110).

Shown in more detail in FIG. 2, the VEM (112) includes a userspace buffer (204). The userspace buffer (112) is where the input to the Guest VE (110) is written after being received from the slave terminal (202) and output from the Guest VE (110) is read into before being passed out of the sub-host VE (108) via the slave terminal (202). In one embodiment of the invention, the userspace buffer (206) is a ring buffer. In one embodiment of the invention, the userspace buffer (206) is not located directly in the VEM (112), but is located where the VEM (112) can access it. In one embodiment of the invention, another data structure may be used by the VEM for passing input and output between the sub-host VE (108) and the VTD (204). In one embodiment of the invention, the userspace buffer is omitted and the VEM (112) forwards data directly between the slave terminal (202) and the VTD (204). In one embodiment of the invention, the userspace buffer (206) is includes multiple channels or buffers, using the separate channels or buffers for input and output.

In one embodiment to the invention, the host extender (208) is located in the sub-host VE (108) portion of the VTD (204). The host extender (208) includes a host buffer (210) and is configured to pass data back and forth with a guest extender (212) portion of the VTD (204). The host extender (208) is accessed from the sub-host VE (108) via hostcalls.

The host extender (208) accesses the guest extender (212) using vmcalls. Hostcalls and vmcalls are discussed below and in FIGS. 4 and 5.

The data passed to the host extender (208) from both the guest extender (212) and the VEM (112) is written to the host buffer (210). In one embodiment of the invention the host buffer (210) is a ring buffer. In one embodiment of the invention the host buffer (210) is omitted and the host extender (208) forwards data directly between the VEM (112) and the guest extender (212). In one embodiment of the invention, the host buffer (206) includes multiple channels or buffers, using the separate channels or buffers for input and output.

In one embodiment of the invention, the guest extender (212) is the portion of the VTD (204) located in the guest VE (110). The guest extender includes a VST (214) that is connected to the guest VE (110). The VST (214) is a virtual hardware peripheral created and managed by the VEM (112), which is used to simulate physical input and output of data to the guest VE (110). The guest extender (212) is enabled to be accessed by the host buffer (210) located in the host extender (208) via vmcalls. In one embodiment of the invention, the guest extender (212) is controlled by the host extender (208) directly, and is no more than an interface by which the host extender (212) passes data to and from the VST (210).

Continuing with FIG. 2, in one embodiment of the invention, a login handler (216) may be located in the sub-host VE (108). The login handler (216) includes functionality to receive output from the slave terminal (202) and pass the output to the VEM (112). In one embodiment of the invention, the login handler (216) includes functionality to collect information about a particular instance of the slave terminal (202). The information may be collected in order to create an instance of a terminal within the guest VE (110) that is the same as the particular instance of the slave terminal (202). As used herein, an instance of the terminal is the same as the particular instance when the instance is identical or substantially identical to the particular instance. The login handler (216) may be configured to modify the information collected in order to accommodate the requirements of communication between different execution environments.

In one embodiment of the invention, the login handler (216) includes functionality to instantiate the VTD (204). The login handler (216) includes functionality to use the VEM (112) to hotplug, into the guest VE (110), the portion of the guest extender (212) that is configured as the VST (214). The login handler (216) may include additional functionality without departing from the scope of the invention. Hotplugging is connecting or adding hardware to computer, in this case virtual hardware and a virtual environment while the computer is powered up and in a state of execution. In one embodiment of the invention, multiple login handlers (216) may exist. In such embodiments, a new login handler (216) is required for every additional login session. In one embodiment of the invention, the login handler (216) is omitted and the VEM (112) is configured to communicate directly with the slave terminal (202).

Figure 3:
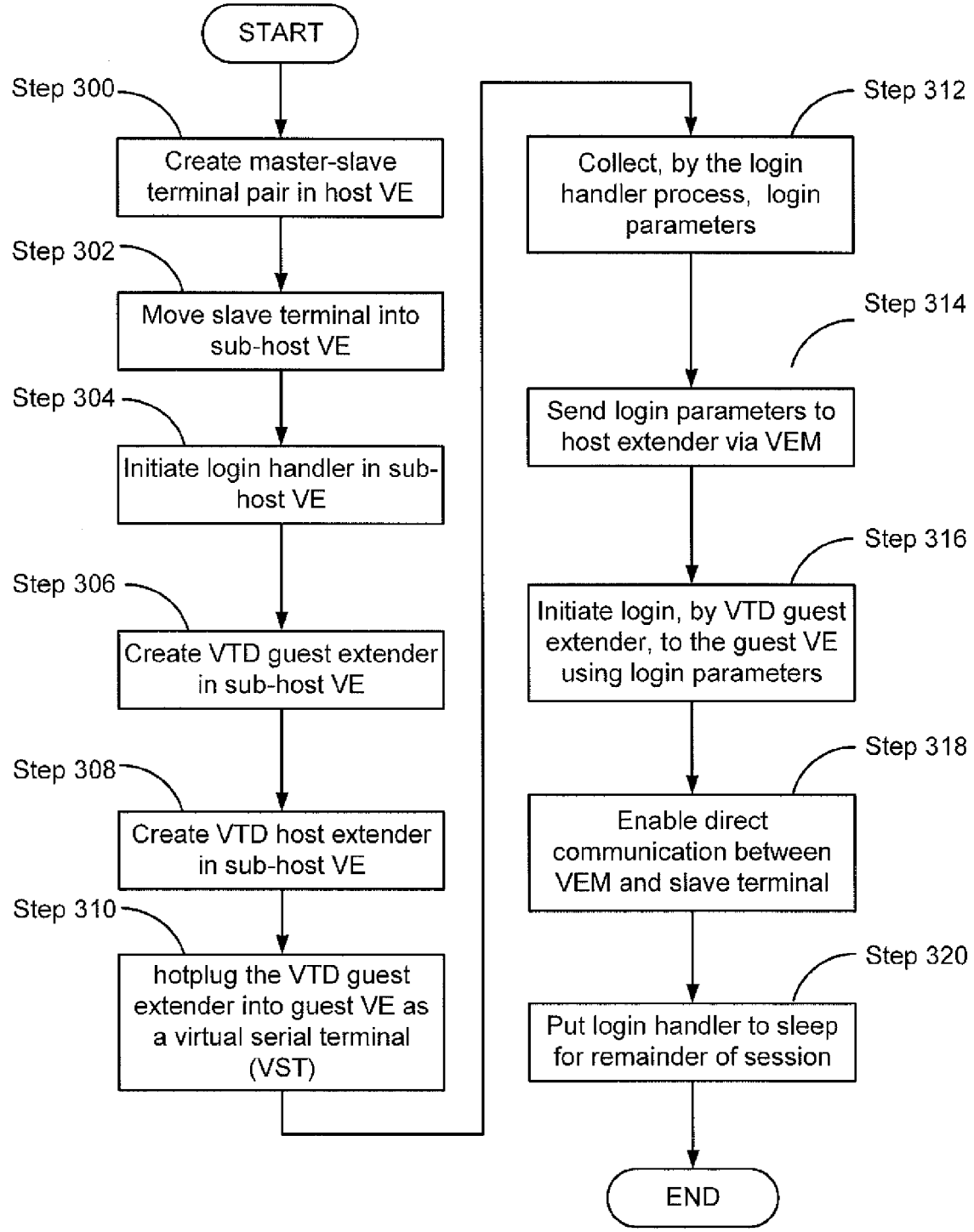
FIG. 3 shows a flowchart for setting up a login session in the guest virtual machine in one embodiment of the invention.
Figure 4:
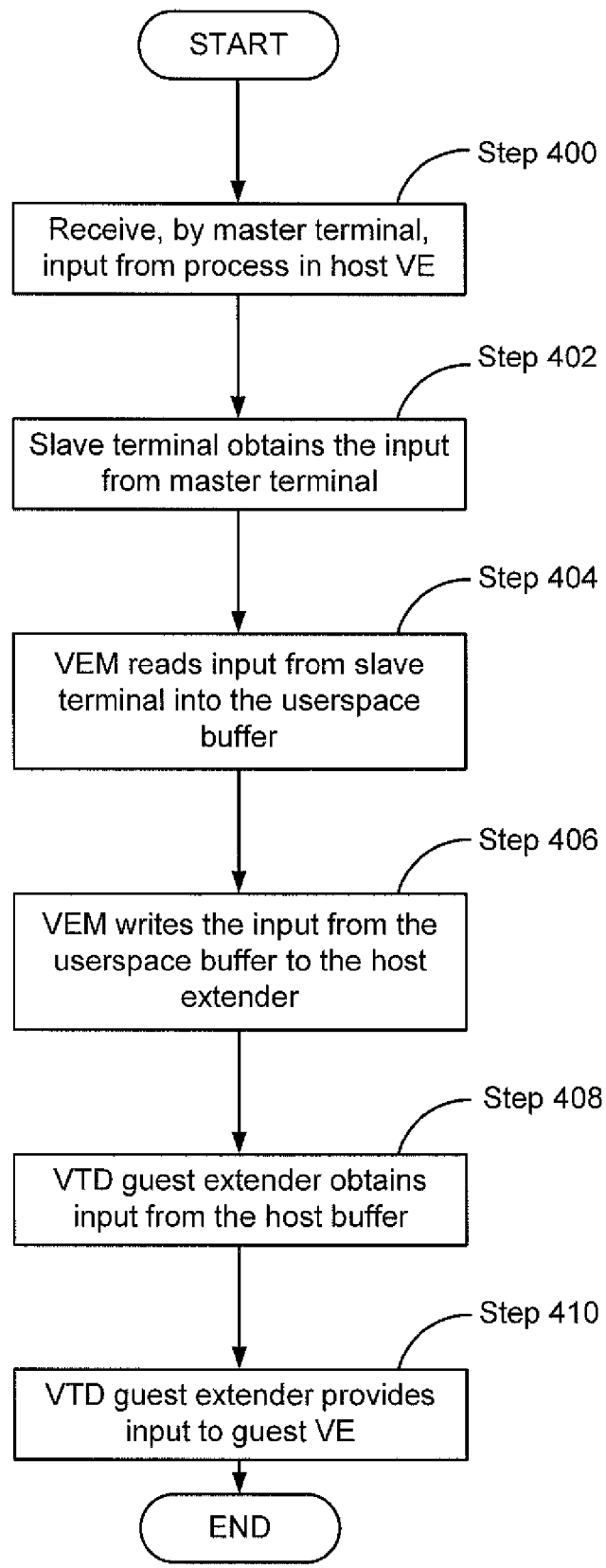
FIGS. 4 and 5 show flowcharts for passing data in one embodiment of the invention.
Figure 5:
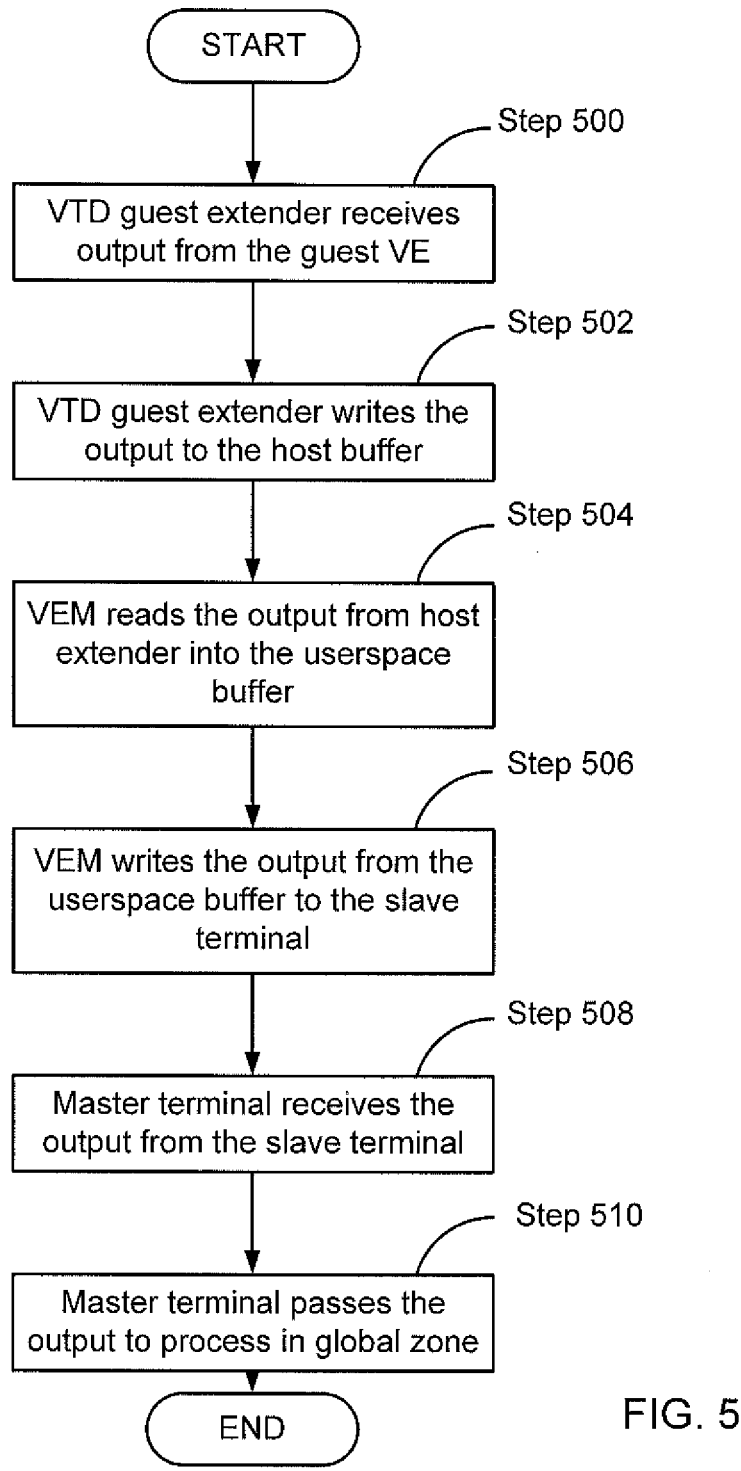

FIGS. 3-5 show flowcharts in accordance with one embodiment of the invention. While the various steps in the flowcharts are presented and described sequentially, one of ordinary skill will appreciate that some or all of the steps may be executed in different orders, may be combined or omitted, and some or all of the steps may be executed in parallel.

FIG. 3 shows a flowchart for initiating a login session to a guest VE from a host VE in accordance with one embodiment of the invention.

In Step 300, a master-slave terminal pair is created in the host VE. The master-slave terminal pair may be created directly by the entity logging in to the guest VE, may be done automatically if access to the guest VE is attempted, or may be instantiated when the guest VE is instantiated.

In Step 302, the slave terminal is relocated from the host VE to the sub-host VE. Specifically, when the sub-host VE is a non-global zone and the host VE is a global zone, the process corresponding to the slave terminal is reassigned from the context of the global zone to the context of the non-global zone. In one embodiment of the invention, relocating the slave terminal may include modifying flags, variables, and/or other metadata describing the slave terminal. In one embodiment of the invention, when the sub-host VE is a separate VE, the master and slave terminals may be initially instantiated separately in the different virtual environments and Step 302 may be omitted. In one embodiment of the invention, the guest VE may be located directly in the host VE and Step 302 may be omitted.

In Step 304, a login handler is instantiated within the non-global zone. In one embodiment of the invention, login may be handled directly by the entity controlling the master terminal and steps 304 and 312 through 320 may be omitted.

In Step 306, the guest extender of a VTD is created in the sub-host VE. As discussed above, all or a portion of the guest extender is the VST, which allows it to communicate with the guest VE appearing as a serial terminal to the guest VE. The creation of the VST may be done in all or in part by the VEM, in order to better facilitate step 310.

In Step 308, the host extender, including the host buffer, of the VTD instance is created in the sub-host VE. In one embodiment of the invention, the userspace buffer may also be created, in the VEM, in the VTD, or elsewhere in the sub-host VE. In one embodiment of the invention, steps 306 and 308 may be performed in parallel with one or both of steps 300 and 302. The creation of the VTD may be controlled by the login handler, the VEM, the entity controlling the master terminal, or some overarching process controlling the entire login.

In Step 310, the login handler uses the VEM to hotplug the guest extender into the guest VE as a VST. Hotplugging the guest extender includes allowing the guest VE to 'see' the VST as if a physical serial device had just been plugged into the computer; the guest VE is then mounts or connects to the serial terminal the same as if it were physical hardware. The guest VE remains operative while the VST is added. In one embodiment of the invention, other virtualized hardware interfaces may be used to connect the guest extender and the guest VE. In one embodiment, the guest extender creates a process within the guest VE to handle the traffic from the VST.

In Step 312, the login handler collects login parameters for the login session. The login parameters may include the login session information discussed above with respect to FIG. 2. The login parameters may be collected from data passed through the slave terminal and stored parameters known to be required to login to the guest VE. In one embodiment of the invention, variables, flags and other information associated with the instance of the slave terminal itself may also be collected. Additionally, the login handler may modify the login parameters to meet requirements of the environment being logged into. In one embodiment of the invention, the login parameters are used by the VST to mimic the slave terminal.

In Step 314, in one embodiment of the invention, the login parameters are written, via the VEM, to the host buffer located in the host extender of the VTD. Specifically, the login parameters may be written into the host buffer via the connection provided by the VEM, userspace buffer, and host extender. In one embodiment, the login parameters may be collected into a data structure before being sent to the guest VE. Alternatively, in one embodiment, the VTD may be configured to compile the received parameters into a data structure.

In Step 316, the guest extender uses the VST to initiate login to the guest VE. In one embodiment of the invention, initiating login may include passing the login parameters, or the data structure containing the parameters from the host buffer to the guest VE. Alternatively, in one embodiment of the invention, initiating login may be performed by simply exchanging data across the VTD and VEM with either the login handler or the entity controlling the master terminal in the host VE.

In Step 318, after the login session to the guest VE has been established, direct communication between the VEM and the slave terminal is enabled. Specifically, the login handler hands off the connection information of the slave terminal to the VEM. Alternately, if the login handler is unused or used in a reduced capacity, the VEM is initially enabled to communicate with the slave terminal. In Step 320, the login handler goes to sleep for the duration of the session.

FIG. 4 shows a flowchart for passing data into a guest VE from a host VE, in accordance with one embodiment of the invention.

In Step 400, a master terminal located in the host VE receives input from a process in the host VE. In one embodiment, the input may come from a process being executed by the user. Alternately, the master terminal may receive input through a CLI. Other ways of entering data into a terminal may be used without departing from the scope of the invention.

In Step 402, the slave terminal obtains the input from the master terminal. Specifically, the master terminal may send the data to the slave terminal in the sub-host VE. The slave terminal provides the appearance of hardware to the master terminal, allowing remote access to the context of the sub-host VE in which the slave terminal is located. In one embodiment, the slave terminal is configured to exactly duplicate the activity in the master terminal in the sub-host VE context. In one embodiment, the slave terminal is configured to create a login session to the sub-host VE from the master terminal. The slave terminal is configured to pass data to processes within the sub-host VE using standard stream channels. Other methods for accessing processes in a sub-host VE from the host VE other than a master-slave terminal pair may be used without departing from the scope of the invention. In one embodiment of the invention, the guest VE may be located in the host VE, and the master-slave terminal pair may be omitted.

In Step 404, the VEM of the guest VE obtains input from the slave terminal. In one embodiment of the invention, the VEM obtains the input via the slave terminal's standard streams. The VEM then writes the obtained input into the userspace buffer. In one embodiment of the invention, the input may pass through and be modified by the login handler in order to facilitate logging in to the guest VE. The modifications may include altering flags or variables associated with the parameters of the slave terminal in order to force certain behaviors or run the login session in a certain mode, such as 'failsafe mode' or 'user mode'. Additional modification to the configurations or data to make a login session workable in the guest VE may also be required. For example, different shells may represent the same command with different characters, requiring a conversion. Additionally, the login procedure may differ between environments, and require that pieces of information be passed in a different order. Other potential modifications may be used depending on the specific configuration of the system being used without departing from the scope of the invention.

In Step 406, the VEM writes the input from the userspace buffer and into the host buffer of the host extender. The host extender is controlled by hostcalls, which provide information about how to move data. A hostcall is an instruction from the entity controlling the VTD instructing the host extender to perform some action. A hostcall 'write', for example, may instruct the host extender to read data from the userspace buffer and write it to the host buffer. Hostcalls may provide other details about passing the data, such as 'char' which might instruct the host extender to read and write data in individual bytes. A hostcall 'login' might instruct the host extender to create a data structure to put login parameters into or that said parameters are being entered. In one embodiment of the invention, the input may be reformatted or added to a data structure in the host buffer. The host extender may also be configured to automatically detect and handle data transmission.

In Step 408, the VTD guest extender obtains input from the host buffer. The guest extender is controlled with vmcalls, which provide information about how to move data. A vmcall is an instruction to the guest extender informing it that some action needs to be performed. A vmcall 'read', for example, may inform the guest extender that new data is to be read from the host buffer and written to the guest VE. Vmcalls may provide other details about passing the data, such as 'char' which might instruct the guest extender to read and write data in individual bytes. A vmcall 'login' might instruct the guest extender to copy the data structure containing login parameters from the host buffer to the guest VE. The guest extender may also be configured to automatically detect and handle data transmission.

In Step 412, the VTD guest extender provides input to the guest VE. As discussed above, the guest extender is hot-plugged into the guest VE as a VST. Thus, the input is passed into the guest VE using the standard streams of the VST. In one embodiment, the data passed in is forwarded directly from the CLI in step 400 to a duplicate text interface in the guest VE.

FIG. 5 shows a flowchart for passing data out from a guest VE to a host virtual environment in which the guest VE is located, in accordance with one embodiment of the invention.

In Step 500, the guest extender receives the output from the guest VE through the VST. In step 502, the output is written to the host buffer. In one embodiment of the invention, the output is read from the guest extender and written into the host buffer by the host extender. Alternately the guest extender may write the output to the host buffer. As discussed in FIG. 4, in one embodiment of the invention, the guest extender is controlled by vmcalls. A vmcall 'write', for example, may inform the guest extender that new data is to be read from the guest VE and written to the host buffer. Rather than using vmcalls, the guest extender may automatically detect the output and handle data transmission.

In Step 504, the VEM reads the output from the host buffer in the host extender and then writes the output into the userspace buffer. As discussed above, the host extender is controlled by hostcalls. A hostcall 'read', for example, may instruct the host extender to read data from the host buffer and write it to the userspace buffer.

In Step 508, the VEM writes the output to the slave terminal. In one embodiment of the invention, the VEM writes the output to the slave terminal via the slave terminal's standard streams. Modifications to the configuration or data similar to those described in step 404 may be required to make the output useable in the host VE. Other potential modifications may be used without departing from the scope of the invention.

In Step 510, the master terminal receives the output from the slave terminal. More specifically, the output is forwarded from the slave terminal to the master terminal. In one embodiment of the invention, the guest VE may be located directly in the host VE, and this step may be omitted. Alternate methods for passing data from the sub-host VE to a controlling process in the host VE may be used without departing from the scope of the invention.

In Step 512, the master terminal located in the host VE passes the output to the process in the host VE. In one embodiment, the output may be passed to or read by a process being run the user. Alternately, the master terminal may print the output to a CLI. Other ways of reading data from a terminal may be used without departing from the scope of the invention.

Figure 6:
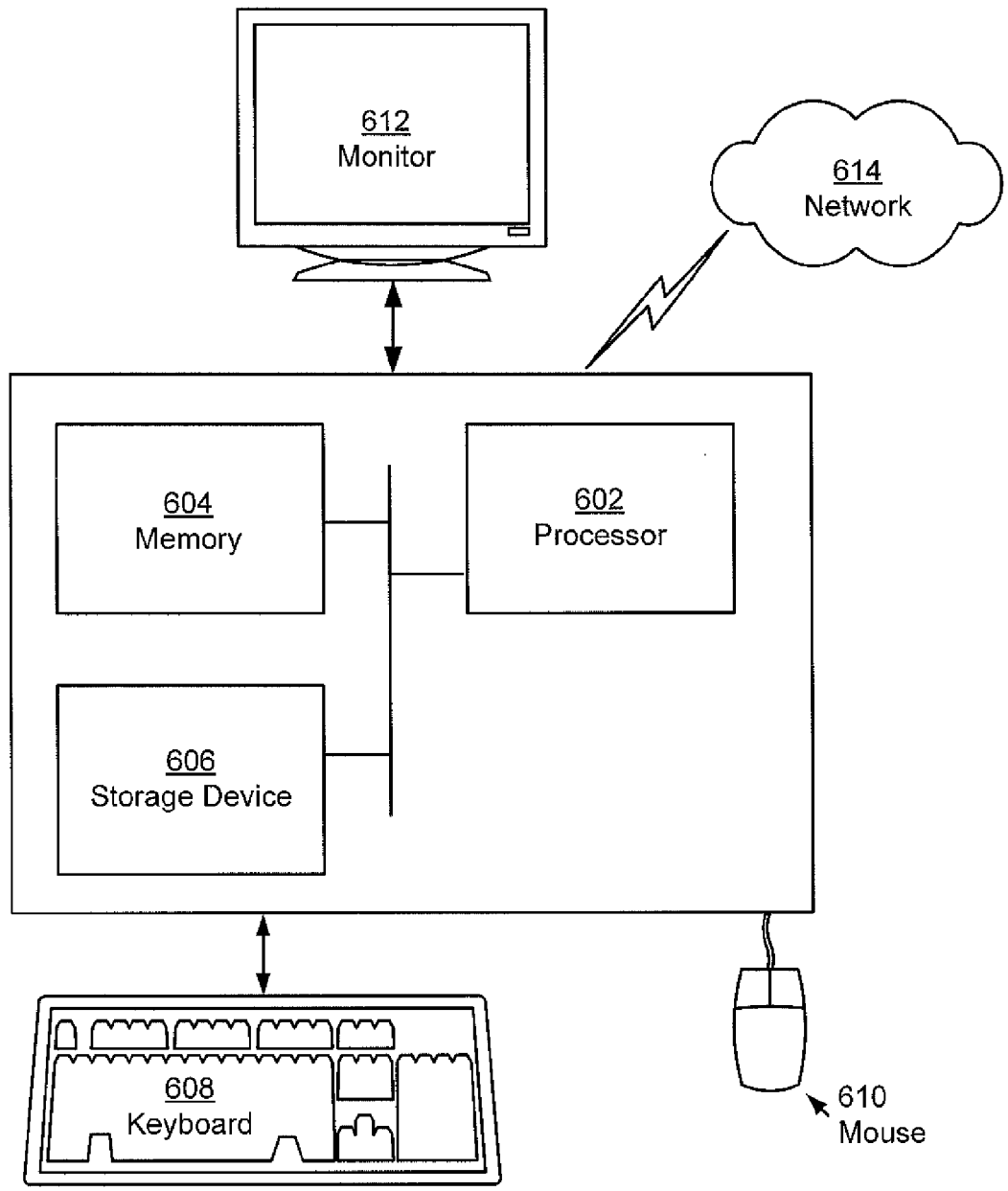
FIG. 6 shows a computer system in accordance with one embodiment of the invention

Embodiments of the invention may be implemented on virtually any type of computer regardless of the platform being used. For example, as shown in FIG. 6, a computer system (600) includes one or more processor(s) (602), associated memory (604), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., service front-end, service engine, profile database, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, or any other non-transitory computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for logging into a guest virtual environment (VE) from a host VE, comprising:
   receiving a request to log into the guest VE from the host VE;
   in response to the request, creating a virtual terminal driver (VTD), wherein the VTD comprises a host extender located in the host VE and a guest extender located in a sub-host VE, wherein the host VE and sub-host VE are configured to communicate using a master terminal and a slave terminal;
   providing the guest extender to the third VE as a virtual serial terminal (VST); and
   logging into the guest VE using the master terminal, the slave terminal, a virtual environment manager (VEM), and the VTD, wherein the guest VE is a virtual machine, wherein the VEM is a hypervisor managing the guest VE, and wherein logging into the guest VE comprises:
      creating, in the sub-host VE, a login handler enabled to communicate with the slave terminal;
      obtaining, by the login handler, login parameters from the slave terminal;
      modifying, by the login handler, the login parameters to create modified login parameters;
      providing the modified login parameters to the guest VE; and
      initializing a login session.

2. The method of claim 1, wherein the host VE is a global zone of an operating system, and the sub-host VE is a non-global zone of the operating system.

3. The method of claim 1, wherein the VEM is located in the sub-host VE.

4. The method of claim 1, wherein logging into the guest VE comprises sending data between the slave terminal and the host extender via the VEM.

5. The method of claim 4, wherein data is exchanged between the VEM and the host extender using a userspace buffer located in the host VE.

6. The method of claim 4, wherein logging into the guest VE further comprises sending data between the host extender and the guest VE via the guest extender.

7. The method of claim 6, wherein data is exchanged between the host extender and the guest extender using a host buffer located in the host VE.

8. The method of claim 1, wherein modifying the login parameters comprises modifying at least one flag in the login parameters to enable non-interactive login to the guest VE.

9. The method of claim 1, wherein logging into the guest VE further comprises:
   after providing the modified login parameters to the guest VE, putting the login handler to sleep for the duration of the session.

10. A system comprising:
    a processor;
    a host virtual environment (VE), executing on the processor, comprising a master terminal;
    a sub-host VE, configured to communicate with the host VE via a slave terminal connected to the master terminal;
    a guest VE, wherein the guest VE is a virtual machine;
    a virtual terminal driver (VTD), comprising:
       a userspace buffer and a host buffer, located in the host VE;

a host extender, located in the host VE configured to read and write the userspace buffer and the host buffer; and a guest extender, located in the sub-host VE, configured to pass data between the host buffer and the virtual machine as a virtual serial terminal (VST), wherein the VTD is created in response to a request to log into the guest VE;

a virtual environment manager (VEM), configured to manage the guest VE and communicate with the VTD, wherein the VEM is a hypervisor; and a login handler, located in the sub-host VE, configured to:
  obtain login parameters from the slave terminal;
  modify a flag in the login parameters to create modified login parameters; and
pass the modified login parameters to the VEM.

11. The system of claim 10, wherein the host VE is a global zone executing an operating system image, and the sub-host VE is a non-global zone executing the operating system image.

12. The system of claim 10, wherein the VEM is located in the sub-host VE.

13. The system of claim 10, wherein the userspace buffer and the host buffer are ring buffers.

14. A non-transitory computer readable medium, comprising instructions, which when executed on a processor, perform a method, the method comprising:
  receiving a request to log into a guest virtual environment (VE) from a host VE, wherein the guest VE is managed by a VEM;
  in response to the request, creating a virtual terminal driver (VTD), wherein the VTD comprises a host extender located in the host VE and a guest extender located in a sub-host VE, wherein the host VE and sub-host VE are configured to communicate using a master terminal and a slave terminal;
  providing the guest extender to the guest VE as a virtual serial terminal (VST); and
  logging into the guest VE using the master terminal, the slave terminal, the VEM, and the VTD, wherein the guest VE is a virtual machine, wherein the VEM is a hypervisor, and wherein logging into the guest VE comprises:
    creating, in the sub-host VE, a login handler enabled to communicate with the slave terminal,
    obtaining, by the login handler, login parameters from the slave terminal,
    modifying, by the login handler, the login parameters to create modified login parameters,
    providing the modified login parameters to the guest VE, and
    initializing a login session.

15. The non-transitory computer readable medium of claim 14, wherein the host VE is a global zone of an operating system, and the sub-host VE is a non-global zone of the operating system.

* * * * *